(12) United States Patent
Chao (10) Patent No.: US 6,643,273 B2
(45) Date of Patent: *Nov. 4, 2003

(54) SATELLITE COMMUNICATION SYSTEM (75) Inventor: William W. Chao, Cupertino, CA (US)

(73) Assignee: Lockheed Martin Corporation, Bethesda, MD (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/739,329

(22) Filed: Dec. 19, 2000

(65) Prior Publication Data

US 2001/0000455 A1 Apr. 26, 2001

Related U.S. Application Data (63) Continuation of application No. 08/947,015, filed on Oct. 8, 1997, now Pat. No. 6,215,776.

(51) Int. Cl.[7] .............................................. H04B 7/185
(52) U.S. Cl. ..................... 370/316; 370/466; 370/471
(58) Field of Search .................................. 370/310, 316, 370/464, 466, 467, 469, 473, 535, 536, 537, 902, 912, 916, 465, 470, 471

(56) References Cited

U.S. PATENT DOCUMENTS

| | | | |
|---|---|---|---|
| 4,991,133 A | 2/1991 | Davis et al. ................. | 364/900 |
| 5,142,622 A | 8/1992 | Owens ........................ | 395/200 |
| 5,280,480 A | 1/1994 | Pitt et al. .................. | 370/85.13 |
| 5,408,237 A | 4/1995 | Patterson et al. ........... | 342/354 |
| 5,434,852 A | 7/1995 | La Porta et al. ............ | 370/58.2 |
| 5,485,464 A | 1/1996 | Strodtbeck et al. ......... | 370/95.2 |
| 5,581,558 A | 12/1996 | Horney, II et al. ......... | 370/401 |
| 5,600,629 A | 2/1997 | Van Daele et al. .......... | 370/349 |
| 5,625,867 A | 4/1997 | Rouffet et al. .............. | 455/13.1 |
| 5,634,190 A | 5/1997 | Wiedeman ................. | 455/13.1 |
| 5,732,351 A | 3/1998 | Olds et al. ................... | 455/436 |
| 5,757,416 A * | 5/1998 | Birch et al. ..................... | 348/6 |
| 5,852,721 A * | 12/1998 | Dillon et al. ........... | 395/200.47 |
| 5,995,725 A * | 11/1999 | Dillon .................... | 395/200.33 |
| 6,058,429 A * | 5/2000 | Ames et al. ................. | 709/242 |
| 6,115,750 A * | 9/2000 | Dillon et al. ............... | 709/235 |
| 6,493,342 B1 * | 12/2002 | Breslow et al. ............. | 370/394 |
| 2002/0101831 A1 * | 8/2002 | Gutman et al. ............. | 370/316 |

* cited by examiner

Primary Examiner—Melvin Marcelo
(74) Attorney, Agent, or Firm—Townsend and Townsend and Crew LLP (57) ABSTRACT

A communication system for multimedia having a plurality of mobile and fixed terminals. The system links terrestrial communication systems together through a network of non-geostationary satellites. The terrestrial communication systems include fixed location, mobile, and portable communication systems.

The satellites communicate with a communication protocol similar to terrestrial communication protocols. This reduces protocol conversion.

The source and destination addressing uses static terrestrial cells for the uplink and the downlink.

Terminal data stream is segmented into communication packets at the terrestrial gateway based on the uplink satellite's determination of system parameters. The non-geostationary satellites route the communication packets the satellites. The control satellite dynamically balances up-links and down-links in the terrestrial areas with over-lapping satellite coverage.

73 Claims, 6 Drawing Sheets

| INDEX ~110 | TERMINAL ~112 | GATEWAY ~114 | CELL NO. ~116 |
|---|---|---|---|
| 1 | BILL | GW_ONE | 25.1.4.4 |
| 2 | TERRY | GW_TWO | 25.3.3.4 |
| 3 | BOB | GW_ONE | 25.1.4.4 |
| 4 | TED | GW_THREE | 33.5.6.2.1 |
| ... | | | |

*FIG. 5*

| SATELLITE PLANE : 1 ~120 | |
|---|---|
| SATELLITE ~118 | STATIC CELL |
| 1 | 25, 28, 29 |
| 4 | 8, 9 |
| 7 | 1 |
| 12 | 25, 26, 28 |
| 16 | 25 |
| ... | |

*FIG. 6*

| 124 | 126 | 128 | 130 | 132 | 134 |
|---|---|---|---|---|---|
| | | CALL INFORMATION | | | |
| CELL ADDRESS | USER | DESTINATION CELL ADDRESS | DURATION | USER SERVICE | CALL TYPE |
| 25.1.4.4 | BILL | 96.4.3 | 18.0567 | | POINT-TO-POINT |
| 25.3.3.4 | TERRY | 3.5 | 6.5202 | | MULTI-CAST |
| ... | | | | | |

FIG. 7

| 124 | 136 | 138 | 140 |
|---|---|---|---|
| | SATELLITE INFORMATION | | |
| CELL ADDRESS | LoS SATELLITES | LoS TRAFFIC STATUS | LoS ISL STATUS |
| 25.1.4.4 | A | 80% | 2 |
| 25.1.4.4 | B | 10% | 2 |
| 25.1.4.4 | D | 95% | 1 |
| 25.3.3.4 | A | 80% | 6 |
| 25.3.3.4 | C | 50% | 6 |
| 25.3.3.4 | G | 62% | 1 |
| ... | | | |

FIG. 8

| 150 | 152 | 154 | 156 | 158 | 160 | 162 |
|---|---|---|---|---|---|---|
| | SATELLITE (PLANE, NUMBER) | | | | | |
| CELL ADDRESS | A (1, 5) | B (2, 3) | C (1, 6) | D (1, 7) | E (2, 4) | ... |
| 25.1.4.4 | | -3 MIN | -6 MIN | -1 MIN | +1 MIN | |
| 25.3.3.4 | -1 MIN | -4 MIN | -6 MIN | -2 MIN | | |
| ... | | | | | | |
| 26.1.2.3 | -2 MIN | | +7 MIN | -3 MIN | | |
| ... | | | | | | |

FIG. 9

SATELLITE COMMUNICATION SYSTEM

This application is a continuation of U.S. patent application Ser. No. 08/947,015, filed Oct. 8, 1997, now U.S. Pat. No. 6,215,776.

FIELD OF THE INVENTION

The present invention relates generally to a method of communicating between data processing systems, and more particularly, to terrestrial communication systems communicating through a satellite communication system.

BACKGROUND OF THE INVENTION

Various communication systems provide a communication path between terrestrial data processing systems through a satellite system. The earliest satellite systems, known as "bent pipe" satellites, echoed signals between terrestrial transmitters and receivers. These systems required a significant number of satellites and terrestrial transmitters and receivers.

More recently, satellite systems route communication between satellites, thus requiring fewer terrestrial stations. Inter-satellite routing methods include circuit switching and packet switching. Circuit switch routing defines a communication path from source to destination and maintains that channel throughout the communication. Circuit switching is inherently inefficient since the channel is dedicated to the communication regardless of the amount of data being transmitted.

Packet switch routing, also known as virtual circuit switching, allocates the communication paths for each segment("packet") of the communication rather than the entire communication. Thus, a path can be used by multiple terminals, since each only uses that path during data transmission. U.S. Pat. No. 5,600,629 discloses an example packet switch routing system.

Communication paths can be either static or dynamic. Static communication paths are determine at the beginning of a communication session and used throughout that session. Since the routing is static, all packets associated with the communication follow the same communication path. Static routing provides a simple mechanism to route messages. However, it fails to take to advantage of changing loads and resource availability.

Dynamic routing transfers data packets based on system resource availability. Thus, each data packet may traverse the network through a different route. However, dynamic routing that bases route determination on system resource that are available at the beginning of a transmission fail to take advantage of resource changes that occur during the transmission of the data packets.

Satellite communication protocols often vary substantially from their terrestrial counterparts. Thus, significant time and computations are required to convert terrestrial communication protocols to satellite communication protocols. A need exists for a satellite system that uses a protocol substantially similar to terrestrial protocols.

Addressing in satellite systems is either based on satellite location or fixed geographic locations.

An Earth fixed cell addressing methods is disclosed in U.S. Pat. No. 5,408,237, Patterson, et al. Such addressing reduces the computations during the transfer or "hand-off" of terrestrial links.

Non-geostationary satellites must hand-off terrestrial communication links before the satellite's coverage area moves beyond the terrestrial gateway. U.S. Pat. No. 5,625,867 discloses a hand-off method based in part on the quality of service. Efficient utilization of over-lapping can be maximized by determining hand-off based not only on quality of service but also on a variety of system parameters. Thus, a need exists for a satellite system to base the hand-off decision on a variety of system parameters.

Existing satellite systems coordinate between two over-lapping satellites. The satellite currently linked to the terrestrial station acts as the master and the other over-lapping satellite acts as as slave. As the master, a satellite determines when to hand-off a communication link. Over-lapping satellites require more coordination when the complexity of determining efficient hand-offs increases, and when the number of overlapping satellites increase, and when the number of hand-offs increases. Thus, a need exist for a satellite system with a coordinating satellite that determines when hand-off should occur and between which satellites the hand-off should occur. Such a control satellite minimizes the computations required to determine the optimal load balancing between over-lapping satellites within the static cell.

SUMMARY OF THE INVENTION

An object of the present invention is to link remote terrestrial terminals together through a dynamically routed packet switched satellite communication system using a protocol which is substantially compatible with terrestrial network protocols.

Another objects of this invention is to reduce the search time for dynamically routing packets.

A further object of this invention is to manage non-geostationary satellites in order to balance the communication load for the respective satellites.

DETAILED DESCRIPTION OF THE PREFERRED EMBODIMENT

Figure 1:
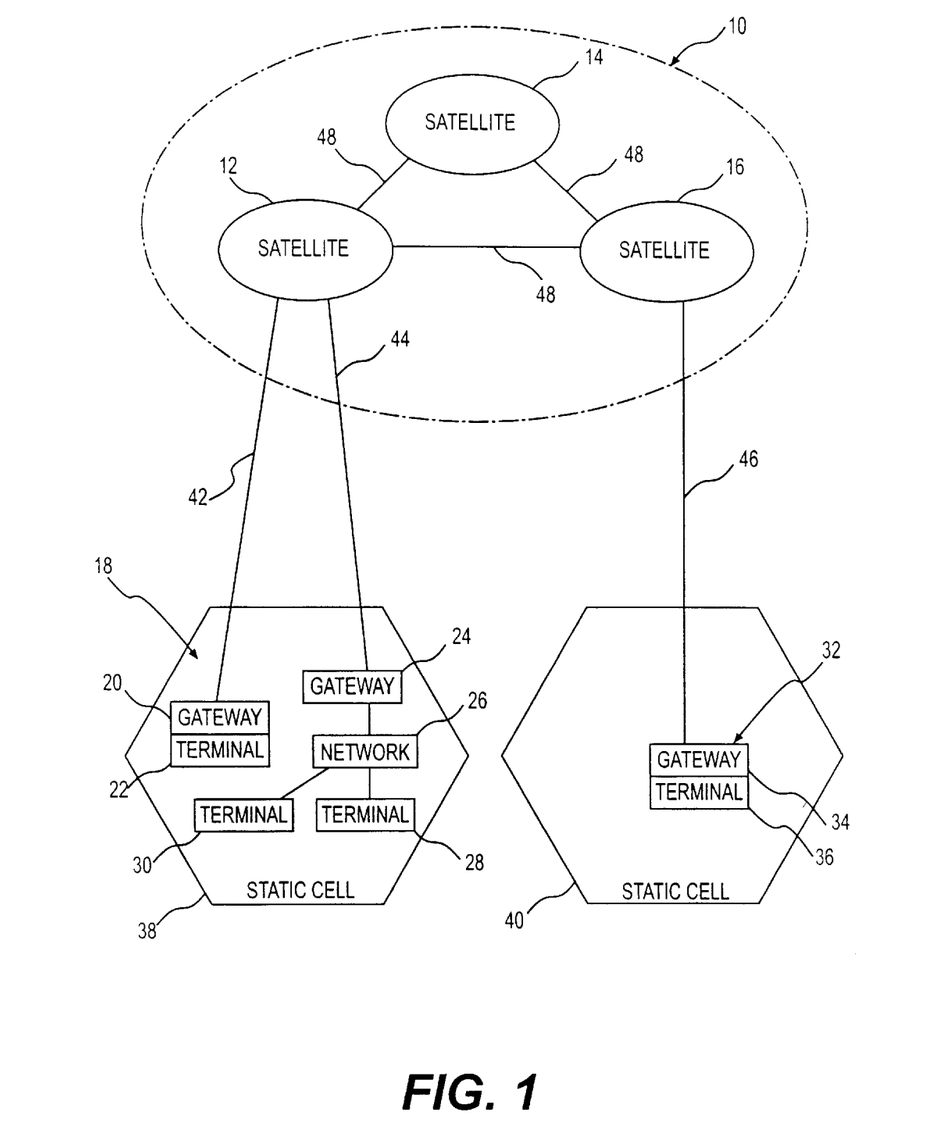
FIG. 1 is a schematic representation of a communication system connecting remote terrestrial systems together through a satellite system.

Referring to FIG. 1, various terminals 22, 28, 30, and 36 are linked together through a satellite communication system 10. The satellite communication system 10 includes a plurality of non-geostationary orbiting satellites 12, 14, and 16.

Figure 5:
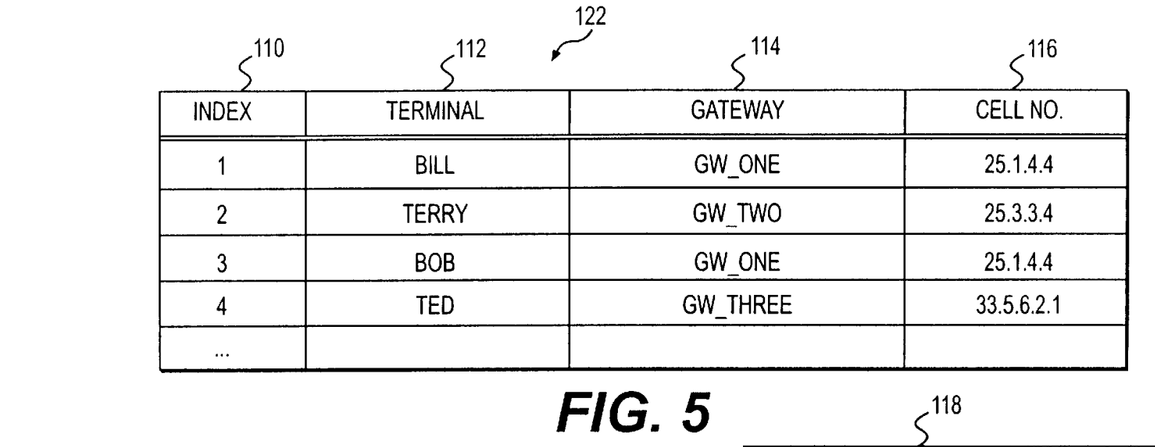
FIG. 5 is a representative table of terminals and their associated cell identification.

A terminal 22 in a static cell 38 communicates with a terminal 36 in a remote static cell 40 through a satellite communication system 10. Terminals 30 and 28 are linked directly or through a network 26 to a gateway 24. While not shown In FIG. 1, a terminal 30 can communicate with more than one gateway and a gateway 24 can communicate with one or more satellites. For example, FIG. 5 represents a table of links between terminals in column 112 and gateways in column 114. A static cell "25.1.4.4" in column 116 has one or more gateways within it.

As satellites orbit the Earth in non-geostationary orbits, their respective terrestrial coverage areas vary. Every satellite in the satellite communication system 10 is linked to at least one other satellite in that system. For example, FIG. 1 shows satellite 12 linked to satellite 14, which in turn is linked to satellite 16. A satellite 12 communicates with one or more gateways within one or more static cells.

Figure 6:
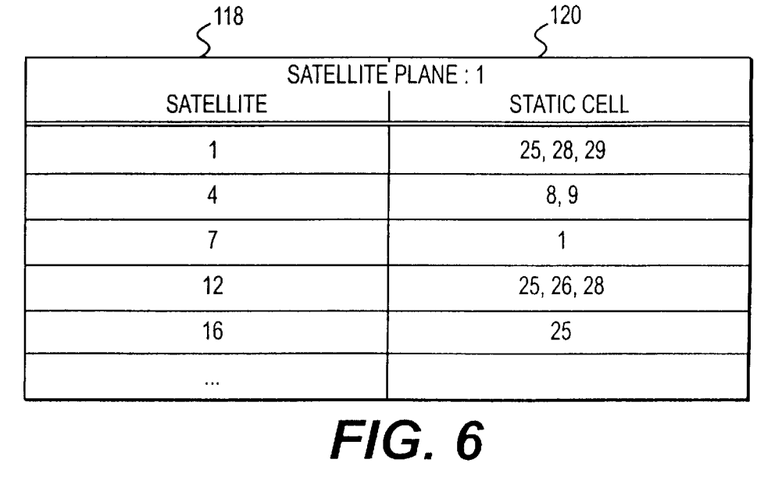
FIG. 6 is a representative table of cells covered by each satellite in a plane.
Figure 7:
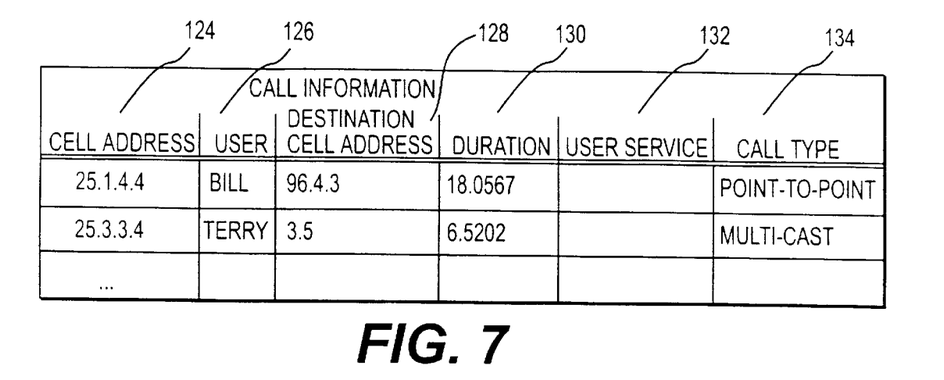
FIG. 7 is a representative table of connection information for each in progress communication stream.
Figure 8:
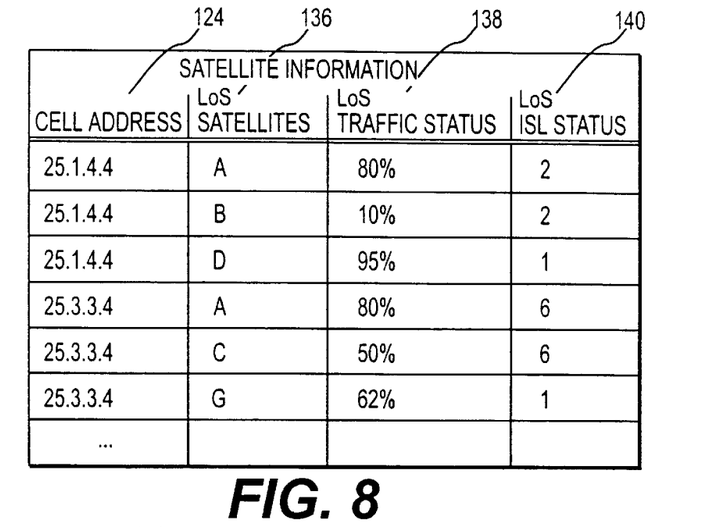
FIG. 8 is a representative table of satellite loading per cell.

Referring to FIG. 6, each satellite in plane 1 and its corresponding coverage area are tracked in column 118 and 120 respectively.

The gateway 20 (FIG. 1) communicates with one or more satellites when are within the satellite's coverage area. When a gateway is within the coverage area of a plurality of satellites the gateway is in what is known as an overlap state. A gateway is "blacked-out" when it is outside the coverage area of any satellites in the satellite communication system 10.

Referring to FIG. 1, a plurality of terminals 28 and 30 in a static cell 38 are linked to a single gateway 24. While not shown in FIG. 1, a terminal 30 can communicate with a plurality of gateways. A terminal 28 and 30 can be remotely located with respect to a gateway 24 or a terminal 22 can be co-located with a gateway 20. The terminals 22, 28, and 30 and the gateways 20 and 24 can be fixed location devices, mobile devices, or portable devices. They can be land based, water based, or airborne devices. For example, a mobile satellite phone 32, which communicates directly with a satellite 16, contains both a terminal 36 and a gateway 34 in one hand-held unit 32.

Typically, communication between terminals 28 and 30 follows a structured communication protocol, such as the Internet Protocol version 4 ("IPv4"), Internet Protocol Next Generation ("IPv6"), or asynchronous transfer mode ("ATM"). A gateway 24 translates the terminal protocol to the satellite communication protocol before transmitting the communication to the satellite 12.

In accordance with the present invention, the satellite communication protocol is substantially similar to the terminal protocol. As a result, the translation computations needed to convert between the terminal and the satellite communication protocol are minimized.

The satellite 12 (FIG. 1) in communication with a source gateway 24 in a static cell 38 determines the optimal payload length 88 (FIG. 4) for transmitting a data stream through the satellite communication system 10. The gateway 24 segments the communication stream into packets 70 of the optimal length. The optimal payload length 88 is based on dynamic communication factors in the satellite communication system 10. These factors include link error rate, duality of service, priority, cost of service, and the number of available links.

Figure 2:
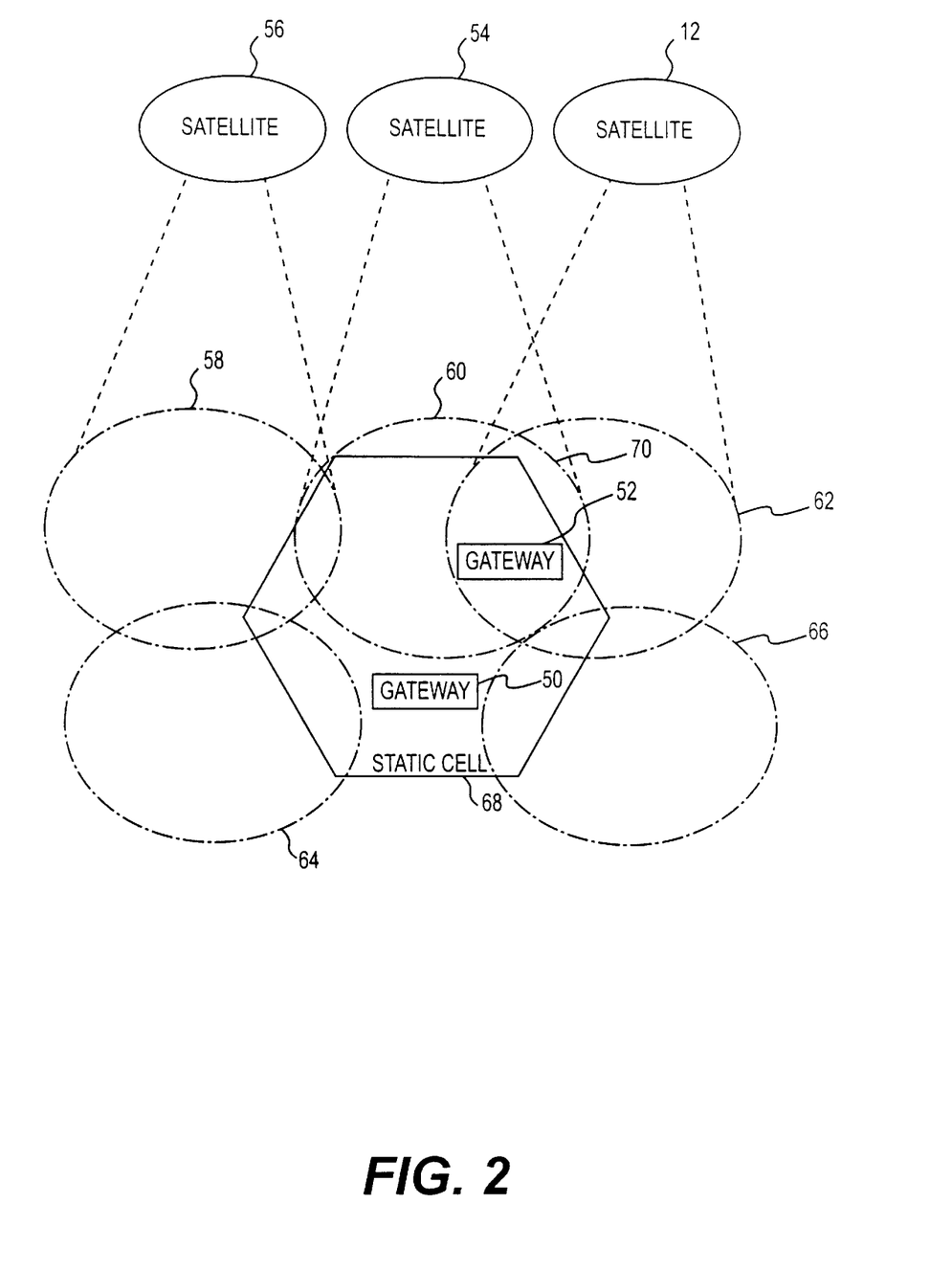
FIG. 2 is a schematic representation of satellite coverage areas.
Figure 3:
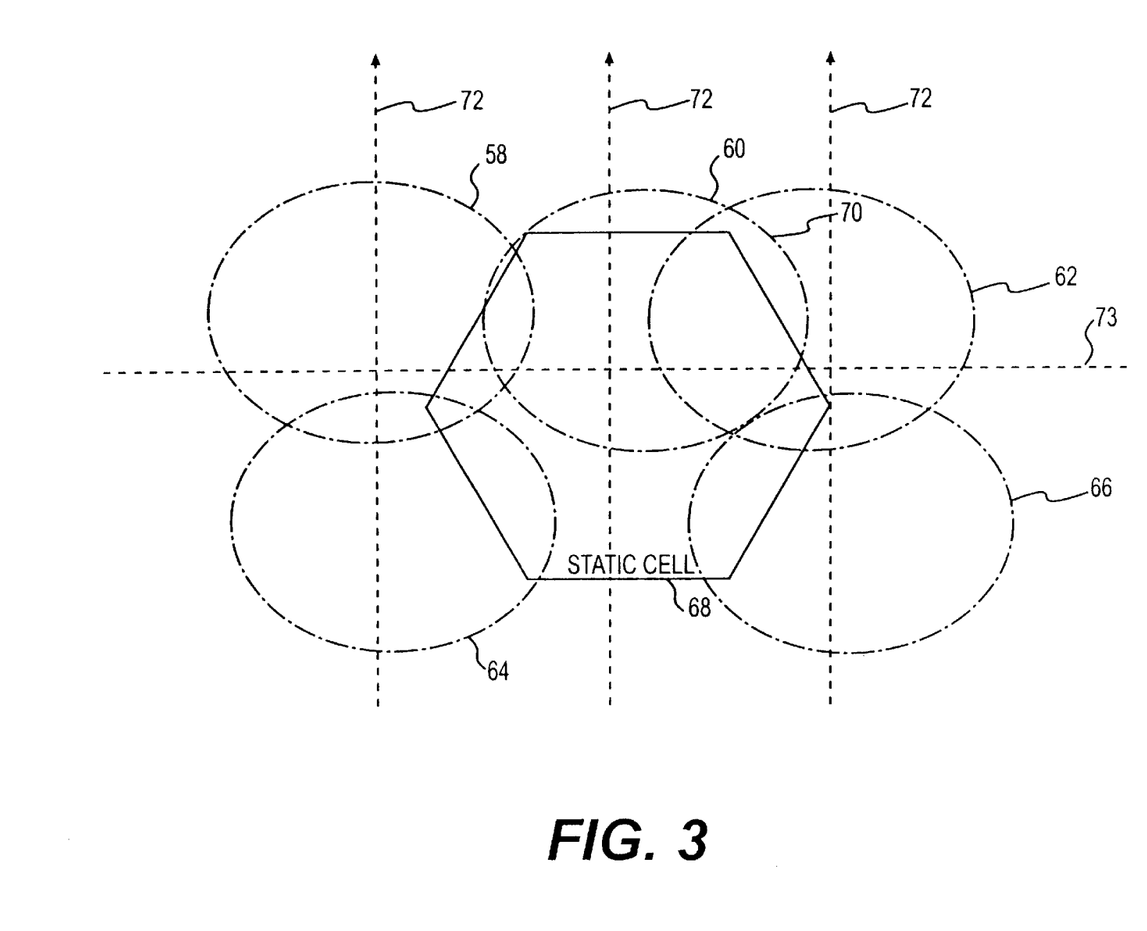
FIG. 3 is a schematic representation of satellite orbits and satellite planes.

Referring to FIG. 2, all potential terrestrial coverage areas are partitioned into static cells as disclosed in U.S. Pat. No. 5,408,237. The satellites are addressed by plane number and satellite number. The planes 73 (FIG. 3) are perpendicular to the orbits 72 of the non-geostationary satellites 12, 14, and 16 (FIG. 1).

For example, FIG. 5 shows a representative table of terminal links to gateways and the associated static cell address of the gateway. This table is updated when a gateway moves to a different static cell address.

Referring to FIG. 6, a representative table of satellites in a plane 1 identifies which static cell each satellite is in contact with. Each control satellite in control of static cell in plane 1 monitors this table. Each control satellite 54 (FIG. 2) updates the table when the information concerning a satellite 56 (FIG. 2) under its control changes. Each control satellite 54 (FIG. 2) transmits the updates to adjacent control satellites.

Gateway addressing in less populated areas uses fewer levels than addressing in more populated areas. There is no technological limit to the number of levels that can be used for addressing. However, it is a preferred embodiment of the present invention that the addressing includes from one to ten levels.

Figure 4:
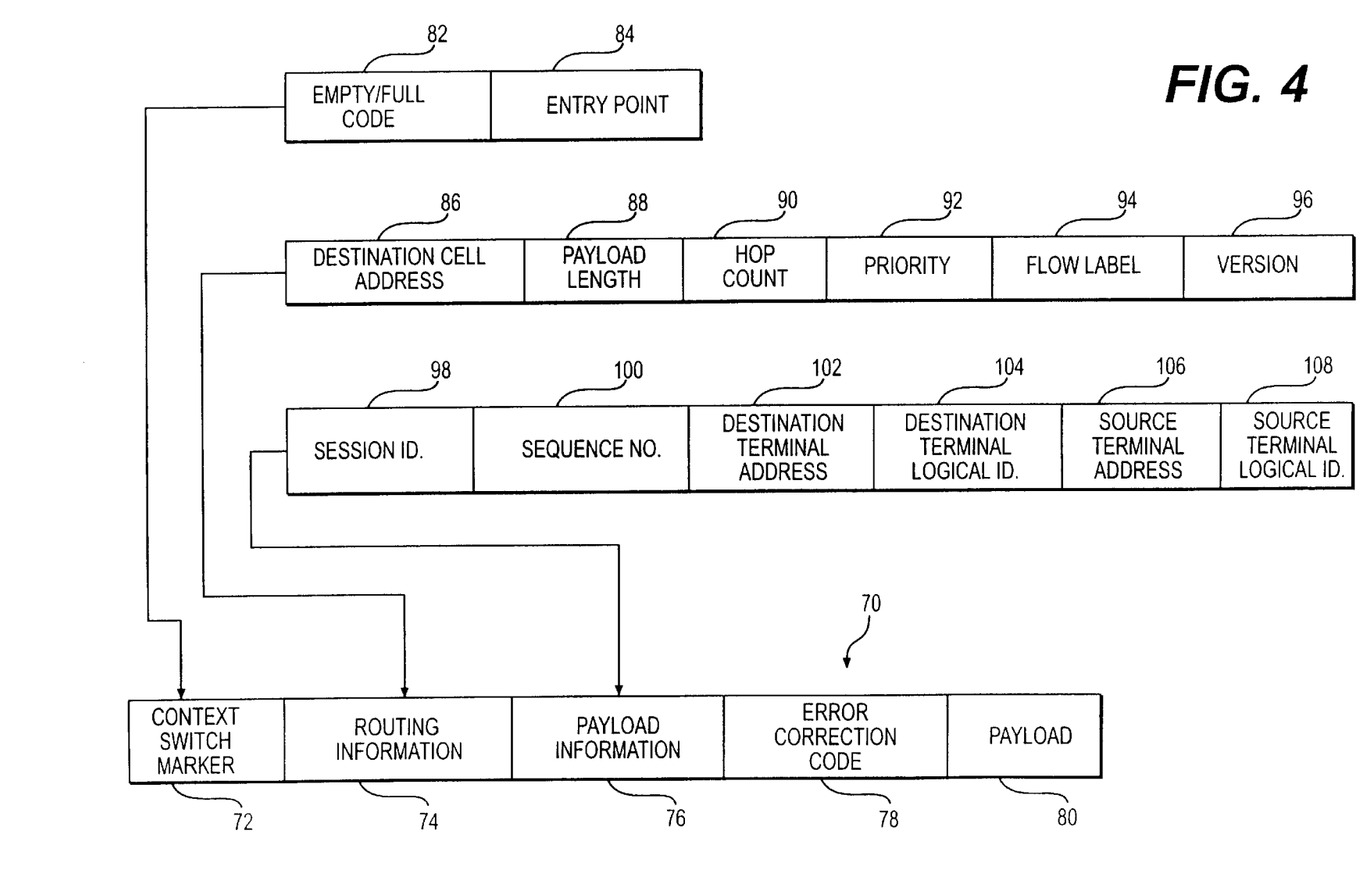
FIG. 4 is a representative table for a satellite communication packet.

Referring to FIG. 1, the satellites 12, 14, and 16 communicate using a satellite communication protocol. FIG. 4 illustrates one such protocol and the structure of a packet 70 within the protocol. As shown in FIG. 4, the packet 70 includes a context switch marker 72, routing information 74, payload information 76, and an error correction code 78, payload ("terminal data") 80.

The context switch marker ("CSM") 72 reduces the computations required to route a packet 70. Since each satellite 12, 14, and 16 determines the optimal route for each packet 70 it receives, the efficiency of the route determination process is critical to the over all system performance. To reduce the subsequent search time, the satellite 12 linked to the source gateway 24 determines not only the current optimal route but a'so a context switch marker 72 for each packet 70 it receives.

The CSM 72 is included in each packet 70 for reference by other satellites 14 and 16 routing the same packet. Referring to FIG. 4, the CSM 72 includes an empty/full code 82 and an entry point 84. The empty/full code 82 indicates whether an entry point 84 has previously been determined and placed in the packet 70.

When a satellite 12, 14, and 16 receives a packet 70 with the empty/full code 82 indicating empty, the satellite 12, 14, and 16 determines the entry point 84 and places it in the packet 70. The entry point 84 provides a starting point in the routing table similar to an index or bookmark. Thus, subsequent satellites 12, 14, and 16 begin their routing search from the entry point 84 and do not search the entire routing table. After each satellite 12, 14, and 16 completes the route determination, the satellite 12, 14, and 16 updates the entry point 84 to reflect current location of the routing information. Thus, if the routing tables changes while a packet is being routed, the entry point 84 remains accurate because each satellite 12, 14, and 16 routing the packet 70 updates the entry point 84.

Each satellite 12, 14, and 16 uses the routing information 74 to determine the optimal route for that packet 70. The routing information 74 includes: a destination cell address 86, a payload length 88, a hop count 90, a priority 92, a flow label 94, and a version 96.

The destination cell address 86 includes an address of the destination gateway 34 (FIG. 1). The payload length 88 specifies the length of the payload 80 in the packet 70. The hop count 90, as defined in Internet Protocol version 6, indicates the maximum number of satellite links allowed for the packet 70.

Referring to FIG. 4, the priority 92 indicates the priority level of a communication stream. Each packet 70 in a communicate stream receives the same priority 92. Traffic from communication streams with higher priority are routed over shorter or more reliable routes. Priority levels as defined in Internet Protocol version 6 include uncharacteristic traffic, filter traffic, unattended data transfer, interactive traffic, Internal satellite traffic, and highest quality of service traffic.

Satellites 12, 14, and 16 are configured by packets 70 with a priority 92 of "internal satellite traffic." Network control centers, remote network control centers, and satellite control centers transmit satellite configuration data. Configuration data includes updates to routing tables and satellite navigation control information.

The flow label 94 provides a 24 bit unique code sequence that uniquely identifies a communication stream as defined by Internet Protocol version 6.

The version 96 is a four bit code that identifies the communication protocol version as defined by Internet Protocol version 6.

Referring to FIG. 4, the payload information 76, is included in the packet 70, but it is not used by the satellite system 10. The payload information 76 can include a less on identification 98, a sequence number 100, a destination terminal address 02, a destination terminal logical identification 104, a source terminal address 106, and a source terminal logical identification 108.

The source gateway 24 (FIG. 1) create the payload information 76. The destination gateway 34 (FIG. 1) uses the payload information 76 to reassemble the payload 80 in the correct order before forwarding the payload to the destination terminal 36 (FIG. 1). For example, a second packet arrives at the destination gateway 34 before the first packet. The destination gateway 34 orders the payload data i the correct sequence based on the sequence number 100 in each of the first and second packets 70. The destination gateway 34 then transmits the data to destination terminal 36.

The Error Correction Code("ECC") 108 enables the satellite system 10 to detect, errors in a packet 70. Depending on the type of error, the ECC 108 can also be used to correct the error.

If an error is detected In a packet 70, the source terminal address 106 and source terminal logical identification 108 are used to notify the source terminal 30 (FIG. 1) that an error occurred. If desired, the destination terminal 36 (FIG. 1) can request the packet. 70 to be re-transmitted.

The payload 80 includes ordered data from a source terminal 30 (FIG. 1) directed toward a destination terminal 36 (FIG. 1). For example, a terminal 30 transferring ten ATM data cells may require two packets 70. The first packet's payload 80 includes the first six ATM data cells in their correct order. The next packet 70 includes the remaining four ATM data cells in their correct order. The ATM data cells including all protocol and header information are encapsulated into the respective payloads.

A communication stream is segmented into packets 70. For each communication stream, a gateway 24 (FIG. 1) requests an optimal payload length 88 from a satellite 12 (FIG. 1). The satellite evaluates system parameters and communication parameters. The system parameters include which satellites are available to link the source and destination gateways, the loads on each of the available satellites, error rate of each satellite, cost of service, and the number of hops required. The communication parameters include the priority, the hop count, and amount of data to be transferred.

The packets 70 are routed among the non-geostationary satellites 12, 14, and 16 using the satellite communication protocol. The optimal route for each packet 70 is determined independently at each satellite. Route determination is based on satellite system parameters. The satellite determines the error rate of every existing link to other satellites and to gateways.

To enhance communication reliability on links with lower quality of service ("QoS"), a source terminal 30 (FIG. 1) can transmit multiple copies of the same packet 70. The payload information of the packet 70 includes identical session identification 98 and sequence numbers. Thus, the destination gateway 34 (FIG. 1) recognize the packets 70 as repeated packets. The gateway 34 then compares the payload of the repeated packets. The recreated payloads are compared bit by bit. That is, the first bit of the payload of each packet s compared, then the next bit is compared until each bit has been compared. The value of each original transmitted bit is determined by a simple majority. Since a simple majority is required to determine the value of the original transmitted data, it is desirable to transmit an odd number of repeat packets. In a preferred embodiment of the present invention three copies of the terminal data are sent when repetition is desired.

Referring to FIG. 2, a control satellite 54 manages the links within the static cell 68 including the selection of satellites with over-lapping coverage areas. For example, gateway 52 is within the over-lap area of two satellites 12 and 54. The control satellite 54 determines which satellite provides a link or route with the gateway. The control satellite follows the route determination process described above.

As explained below, each static cell has a control satellite 54. Communication links with a gateway 52 are balanced between over-Lapping satellites 54 and 12 by the control satellite 54. Thus, if satellite 54 as the control satellite for cell 68 determines that satellite 12 is less loaded than satellite 54, the communication link with gateway 52 is transferred to satellite 12.

The control satellite 54 balances the links based on communication factors including traffic density, transport delays, quality of service, computational capacity, lack of coverage timing, cost of service, and error rate in the static cells. Factors specific to each satellite in the overlap state include logical user identifications of terminal, connection time of each link, satellite identification, end of coverage time per satellite, traffic status, and access code.

Satellite coverage areas are constantly moving since the satellites 12, 54, and 56 are non-geostationary. As a satellite moves to a new static cell, it requests satellite information for all satellites in the new static cell from the control satellite of the new static cell. If no control satellite exists of the new static cell, the first satellite to enter the static cell assigns itself as the control satellite. If a control satellite exists for that static cell, the satellite transmits its satellite information to the control satellite. The satellite information includes connection time of each terrestrial link, satellite identification, end of coverage time per gateway, and access codes.

Moreover, if the satellite was a control satellite In the static cell it is moving out of, it assigns a different satellite as the control satellite for the static cell before leaving the static cell.

Referring to FIG. 2, as a satellite exits a static cell, it transmits an "exiting cell" message to the control satellite. If the exiting satellite is the control satellite, the exiting control satellite determines the satellite with the longest remaining coverage time in the static cell and makes that satellite the next control satellite. The exiting control satellite transmits to each satellite it controls a message identifying the new control satellite.

Figure 9:
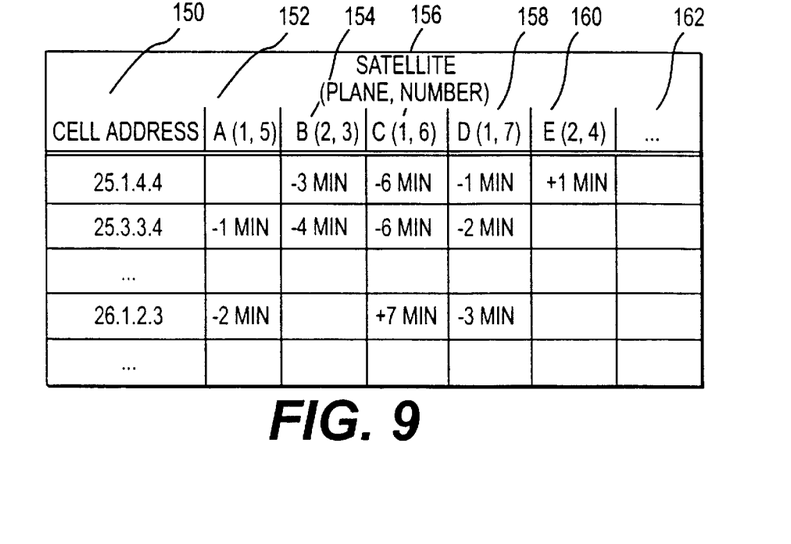
FIG. 9 is a representative table of time based satellite coverage area per cell.

The control satellite maintains satellite coverage information. An example of such information is represented in FIG. 9. Each satellite's time until coverage or coverage time remaining 152, 154, 156, 158, 160, and 162 is updated by each satellite transmitting changes in the information to the control satellite. The table represents static cells in column 150 and the time remaining for current satellites' coverage and the time until future satellites' coverage.

Referring to FIG. 2, a gateway 50 not within the coverage area of a satellite is "blacked-out". Terminals linked to more than one gateway can route their communication through a gateway within a satellite's coverage area to avoid the black-out.

The control satellite 54 for a static cell 68 determines when a gateway 50 will be be blacked-out. The control satellite transmits a message to the gateway 50 before it is blacked-out identifying the black-out start and stop time. The gateway 50 routes messages over available terrestrial links during black-out periods.

If no terrestrial link exists, the gateway 50 stores communication data during a black-out period. Once satellite coverage resumes, the gateway 50 transmits the stored communication data over the satellite link.

The routing information are maintained at each satellite and updated periodically. Examples of the routing information maintained at each satellite is illustrated in FIG. 5 and FIG. 6.

While a preferred embodiment has been shown and described, it will be understood that it is not intended to limit the disclosure, but rather it is intended to cover all modifications and alternate methods and apparatuses falling within the spirit and scope of the invention as defined in the appended claims or their equivalents.

What is claimed is:

1. A method of providing satellite communication among a source terminal, a plurality of communication satellites and a destination terminal, the method comprising:
    determining an optimal packet length;
    creating packets having the optimal length;
    determining an optimal route for each packet among the communication satellites from the source terminal to the destination terminal;
    transmitting at least one of the created packets from the source terminal to a source gateway utilizing a structured communication protocol;
    transmitting at least one of the created packets from the source gateway to a first of the communications satellites, among the communications satellites, and to a destination gateway utilizing a satellite communication protocol substantially similar to the structured communication protocol; and
    transmitting at least one of the created packets from the destination gateway to the destination terminal utilizing the structured communication protocol.

2. The method according to claim 1, wherein the source terminal is mobile.

3. The method according to claim 1, wherein the source terminal is fixed.

4. The method according to claim 1, wherein the source gateway is mobile.

5. The method according to claim 1, wherein the source gateway is fixed.

6. The method according to claim 1, wherein the destination terminal is mobile.

7. The method according to claim 1, wherein the destination gateway is mobile.

8. The method according to claim 1, wherein the destination gateway is fixed.

9. The method according to claim 1, wherein the optimal packet length is determined by a first of the communications satellites.

10. The method according to claim 9, wherein the optimal packet length is based upon one or more parameters selected from the group consisting of link error rate, quality of service, priority, cost of service, and a number of available links.

11. The method according to claim 1, wherein each satellite determines an optimal route for each packet that is transmitted to it.

12. The method according to claim 1, wherein each packet comprises a contact switch marker, routing information, payload information, an error correction code and payload data.

13. The method according to claim 12, wherein the contact switch marker comprises an empty/full code and an entry point.

14. The method according to claim 13, wherein the empty/full code indicates whether the entry has been previously determined.

15. The method according to claim 13, wherein when a satellite receives a packet with an empty code the satellite determines the entry point and places it in the packet.

16. The method according to claim 15, wherein after determining an entry point for a packet, subsequent satellites to which the packet is transmitted begin a routing search from the entry point.

17. The method according to claim 15, further comprising:
    updating the entry point after each satellite completes the optimal route determination.

18. The method according to claim 1, wherein each satellite determines the optimal route utilizing one or more routing information selected from the group consisting of a destination cell, a destination cell address, a payload length, a hop count, a priority, a flow label, and a version.

19. The method according to claims 18, wherein the destination cell address comprises an address of a destination gateway.

20. The method according to claim 1, further comprising:
    assigning a priority to a communication stream.

21. The method according to claim 20, further comprising:
    routing higher priority communication streams to shorter or more reliable routes.

22. The method according to claim 1, wherein the source gateway and terminal are contained in a single apparatus.

23. The method according to claim 1, wherein the source gateway and terminal are contained in separate apparatus.

24. The method according to claim 1, further comprising:
    reassembling the packets in a desired sequence after receipt by the destination gateway.

25. The method according to claim 1, wherein the source gateway requests an optimal payload length from the first satellite that is to receive the packet.

26. The method according to claim 25, wherein the satellite determines the optimal packet length based upon one or more parameters selected from the group consisting of system parameters comprising satellites available to link the source and the destination, loads on each available satellite, error rate of each available satellite, cost of service, and number of hops required and communication parameters comprising priority, hop count, and amount of data to be transferred.

27. The method according to claim 1, wherein a route of the packet among the satellites is determined independently at each satellite at least along the route taken by the packet.

28. The method according to claim 1, wherein a control satellite manages links between the source and the satellites.

29. The method according to claim 28, wherein the control satellite determines which satellites have overlapping coverage areas and determines which satellite provides a route with the source and destination gateways.

30. The method according to claim 28, wherein the control satellite determines the route among the satellites based upon one or more parameters selected from the group consisting of traffic density, transport delays, quality of service, computational capacity, lack of coverage timing, cost of service, and error rate in static cells.

31. The method according to claim 28, wherein the control satellite determines over lapping coverage areas based upon one or more parameters selected from the group consisting of logical user identifications of terminal, connection time of each link, satellite identification, end of coverage time per satellite, traffic status, and access code.

32. The method according to claim 28, wherein if no control satellite exists in a static cell a first satellite entering a static cell assigns itself as the control satellite.

33. The method according to claim 28, wherein as each satellite enters a static cell it transmits its satellite information to the control satellite for the static cell.

34. The method according to claim 33, wherein the satellite information comprises time of each terrestrial link, satellite identification, end of coverage time per gateway, and access codes.

35. The method according to claim 28, wherein as preparation for the control satellite leaving a static cell it assigns another satellite as the replacement control satellite.

36. The method according to claim 35, wherein the replacement control satellite is the satellite with a longest remaining coverage time in the static cell.

37. A satellite communication system, comprising:
a source terminal operable to determine an optimal route for each packet among the communication satellites from the source terminal to a destination terminal and operable to transmit each packet from the source terminal to a gateway utilizing a structured communication protocol and to a first of a plurality of communications satellites utilizing a satellite communication protocol substantially similar to the structured communication protocol;
a plurality of communications satellites operable to transmit each packet among the communications satellites and to a destination gateway utilizing the satellite communication protocol; and
the destination gateway operable to transmit each packet from the destination gateway to the destination terminal utilizing the structured communication protocol.

38. A satellite communication system, comprising:
a source terminal operable to transmit data packets to a source gateway utilizing a structured communication protocol;
the source gateway operable to transmit the data packets to a first of a plurality of communications satellites utilizing a satellite communication protocol substantially similar to the structured communication protocol;
the plurality of communications satellites operable to transmit each of the data packets to a destination gateway via at least some of the other of the plurality of communications satellites utilizing the satellite communication protocol, the plurality of communications satellites configured to determine an optimal route for each of the data packets; and
the destination gateway operable to transmit each packet from the destination gateway to the destination terminal utilizing the structured communication protocol.

39. The system according to claim 38, wherein the source terminal is mobile.

40. The system according to claim 38, wherein the source terminal is fixed.

41. The system according to claim 38, wherein the source gateway is mobile.

42. The system according to claim 38, wherein the source gateway is fixed.

43. The system according to claim 38, wherein the destination terminal is mobile.

44. The system according to claim 38, wherein the destination gateway is mobile.

45. The system according to claim 38, wherein the destination gateway is fixed.

46. The system according to claim 38, wherein an optimal packet length is determined by the first of the plurality of communications satellites.

47. The system according to claim 46, wherein the optimal packet length is based upon one or more parameters selected from the group consisting of link error rate, quality of service, priority, cost of service, and a number of available links.

48. The system according to claim 38, wherein each of the plurality of communications satellites determines an optimal route for each data packet that is transmitted to it.

49. The system according to claim 38, wherein each data packet comprises a contact switch marker, routing information, payload information, an error correction code and payload data.

50. The system according to claim 49, wherein the contact switch marker comprises an empty/full code and an entry point.

51. The system according to claim 50, wherein the empty/full code indicates whether the entry has been previously determined.

52. The system according to claim 50, wherein when a satellite receives a packet with an empty code the satellite determines the entry point and places it in the packet.

53. The system according to claim 52, wherein after an entry point for a packet is determined, subsequent satellites to which the packet is transmitted begin a routing search from the entry point.

54. The system according to claim 52, wherein each satellite updates the entry point after it determines the optimal route.

55. The system according to claim 38, wherein each of the plurality of communications satellites determines the optimal route utilizing one or more routing information selected from the group consisting of a destination cell, a destination cell address, a payload length, a hop count, a priority, a flow label, and a version.

56. The system according to claim 55, wherein the destination cell address comprises an address of a destination gateway.

57. The system according to claim 38, wherein a communication stream comprising a plurality of data packets is assigned a priority.

58. The system according to claim 57, wherein higher priority communication streams are routed to shorter or more reliable routes.

59. The system according to claim 38, wherein the source gateway and the source terminal are contained in a single apparatus.

60. The system according to claim 38, wherein the source gateway and the source terminal are contained in separate apparatus.

61. The system according to claim 38, wherein the destination gateway reassembles the data packets in a desired sequence after receiving the data packets.

62. The system according to claim 38, wherein the source gateway requests an optimal payload length from the first of the plurality of communications satellites.

63. The system according to claim 62, wherein the first of the communications satellites determines the optimal packet length based upon one or more system parameters select from the group consisting of satellites available to link the source and the destination, loads on each available satellite, error rate of each available satellite, cost of service, and number of hops required and communication parameters comprising priority, hop count, and amount of data to be transferred.

64. The system according to claim 38, wherein a route of the data packets among the plurality of communications satellites is determined independently at each of the communications satellites at least along the route taken by the data packets.

65. The system according to claim 38, wherein a control satellite manages links between the source and the communications satellites.

66. The system according to claim 65, wherein the control satellite determines which communications satellites have over-lapping coverage areas and determines which satellite provides a route with the source and the destination gateways.

67. The system according to claim 65, wherein the control satellite determines the route among the communications satellites based upon one or more parameters selected from the group consisting of traffic density, transport delays, quality of service, computational capacity, lack of coverage timing, cost of service, and error rate in static cells.

68. The system according to claim 65, wherein the control satellite determines over-lapping coverage areas based upon one or more parameters selected from the group consisting of logical user identifications of terminals, connection time of each link, satellite identification, end of coverage time per satellite, traffic status, and access code.

69. The system according to claim 65, wherein if no control satellite exists in a static cell a first communications satellite entering a static cell assigns itself as the control satellite.

70. The system according to claim 65, wherein as each communications satellite enters a static cell it transmits its satellite information to the control satellite for the static cell.

71. The system according to claim 70, wherein the satellite information comprises time of each terrestrial link, satellite identification, end of coverage time per gateway, and access codes.

72. The system according to claim 65, wherein the control satellite assigns another satellite as the replacement control satellite prior to leaving the static cell.

73. The system according to claim 72, wherein the replacement control satellite is the satellite with a longest remaining coverage time in the static cell.

\* \* \* \* \*